US008903997B2

(12) United States Patent
Hobbs

(10) Patent No.: US 8,903,997 B2
(45) Date of Patent: Dec. 2, 2014

(54) NETWORK ANALYSIS

(75) Inventor: Martin Hobbs, Bath (GB)

(73) Assignee: Sidonis Ltd, Bath (GB)

( * ) Notice: Subject to any disclaimer, the term of this patent is extended or adjusted under 35 U.S.C. 154(b) by 79 days.

(21) Appl. No.: 13/579,839

(22) PCT Filed: Feb. 16, 2011

(86) PCT No.: PCT/GB2011/050305
§ 371 (c)(1),
(2), (4) Date: Sep. 25, 2012

(87) PCT Pub. No.: WO2011/101672
PCT Pub. Date: Aug. 25, 2011

(65) Prior Publication Data
US 2013/0024562 A1    Jan. 24, 2013

(30) Foreign Application Priority Data

Feb. 17, 2010 (GB) .................................. 1002634.2

(51) Int. Cl.
*G06F 15/173* (2006.01)
*G06F 15/16* (2006.01)
*H04L 12/24* (2006.01)

(52) U.S. Cl.
CPC ............. *H04L 41/08* (2013.01); *H04L 41/0886* (2013.01); *H04L 41/085* (2013.01)
USPC .......................................... 709/224; 709/219

(58) Field of Classification Search
CPC ........................................................ G06F 3/06
USPC ........................................................ 709/224
See application file for complete search history.

(56) References Cited

U.S. PATENT DOCUMENTS

| 6,202,041 | B1 | 3/2001 | Tse et al. | |
|---|---|---|---|---|
| 7,315,801 | B1 | 1/2008 | Dowd et al. | |
| 2002/0169862 | A1* | 11/2002 | Bialk et al. | 709/223 |
| 2002/0169865 | A1* | 11/2002 | Tarnoff | 709/223 |
| 2002/0174207 | A1* | 11/2002 | Battou | 709/223 |
| 2006/0265324 | A1* | 11/2006 | Leclerc et al. | 705/38 |
| 2007/0094491 | A1* | 4/2007 | Teo et al. | 713/153 |
| 2008/0052394 | A1* | 2/2008 | Bugenhagen et al. | 709/224 |
| 2009/0180774 | A1* | 7/2009 | Yan | 398/17 |
| 2012/0284713 | A1* | 11/2012 | Ostermeyer et al. | 718/1 |

OTHER PUBLICATIONS

International Search Report/Written Opinion—dated Jun. 14, 2011, PCT/GB2011/050305, 16 pages.

* cited by examiner

*Primary Examiner* — Gerald Smarth
(74) *Attorney, Agent, or Firm* — Gifford, Krass, Sprinkle, Anderson & Citkowski, P.C.; Mark D. Schneider

(57) ABSTRACT

A method of analyzing a network is disclosed that may include a plurality of interconnected network components, and a network model with component configuration data for each of the network components and component interconnection data for each connection between network components. The method may also comprise selectively altering component configuration data for a first network component, or selectively altering component interconnection data for a first connection, thereby selectively altering a modeled state of the first network component or the first component connection within the network model, propagating the effect of such altering of a modeled state throughout the network model in dependence upon configuration data and interconnection data relating to the first network component and in dependence upon such data relating to other connected network components, monitoring the effect of said propagation on other network components within the network model. Also disclosed is a system for analyzing a network.

7 Claims, 3 Drawing Sheets

NETWORK ANALYSIS

CROSS-REFERENCE TO RELATED APPLICATIONS

This application claims priority of Great Britain Patent Application 1002634.2, filed Feb. 17, 2010, the contents of which are incorporated by reference herein within in their entirety.

BACKGROUND

Managed networks exist everywhere, including telecommunications networks, utilities pipelines, television and radio broadcast networks, to name just a few. Such networks are typically monitored to detect component failures and deviations from optimum performance caused by changing operating conditions. As a result, most conventional networks include self-monitoring systems which vary widely in their level of sophistication depending on the type and complexity of the network involved.

Irrespective of the level of complexity of the network, a managed network can conventionally include centralised or regionalised management capabilities to allow network operators to monitor the status and performance of network components and re-configure the network in response to changing operational needs or failures.

This is acceptable if the managed network can be monitored and maintained by a reasonable number of experienced network operations personnel. Under these circumstances, human operators are responsible for correlating the streams of state change events and performance measurements received from network components and, based on their experience of operating that network under a range of operational and fault conditions, adjusting the operational parameters to provide the required level of service to their customers.

However, where a network becomes more complex with a large number of interconnected network components, it becomes more difficult for network operators to diagnose problems encountered with the network because of the sheer volume of information that is presented to them.

In addition, the continuous reliable operation of the network may be critical, for example, if the network relates to essential telecommunications or nuclear plant control or other infrastructure power supply etc. In these cases it is important that there is an accurate awareness of any vulnerability within the network, the appropriate back-ups designed into the network, and an ability to quickly locate the source of observed network failure.

In this situation, network operators often turn to automated correlation systems in an attempt to offload some of the analysis workload and speed up fault resolution times. Conventionally, such systems analyze state change events and/or performance measurements gathered from the live network and depending on their level of sophistication, attempt to identify network problems, their impact on delivered services and to perform root cause analysis. In general however these types of system are driven by state change events and performance measurement changes caused by actual network problems. Accordingly, they do not typically provide anything more than a localized 'what-if' predictive capability to evaluate the vulnerability of an existing or planned network to component problems or changing operating conditions

SUMMARY OF THE INVENTION

A first aspect of the present invention provides a method of analysing a network which has a plurality of interconnected network components, the method using a network model which includes component configuration data for each of the network components and component interconnection data for each connection between network components, the method comprising:

selectively altering component configuration data for a first network component, or selectively altering component interconnection data for a first connection, thereby selectively altering a modeled state of the first network component or the first component connection within the network model;

propagating the effect of such altering of a modeled state throughout the network model in dependence upon configuration data and interconnection data relating to the first network component and in dependence upon such data relating to other connected network components;

monitoring the effect of said propagation on other network components within the network model.

In this way, selected alterations may be made to the network model and the effect of such changes monitored. For example, a network component may be disabled to mimic network component failure. The effect of this alteration to the configuration data of the network component may then be monitored to assess the impact of the change on the other network components within the network and the effect on the network as a whole and the network outputs. Alternatively, a network connection may be disabled to simulate a connection failure and the effect of this change on the network components and the network as a whole may be monitored. This will allow a picture to be created of the importance of each network component and connection within the network and of the effect on the network outputs. This information can then be relied on as an indication of the failure source when a real-time network output failure or the like is detected.

Alternatively, the selected alteration may mimic degradation or partial compromise of the network component or network connection i.e. operational compromise, but not complete failure. This allows modeling of time-dependent or environment-dependent degradation of network components and/or connections within a network and the effect on other part of the network including network outputs.

The use of the term 'configuration data' is intended to include, but is not restricted to, passive configuration data such as name, type and connectivity data; data representing an operational status such as 'in-service', 'out-of-service', 'commissioning' and the like; data representing an operational state as a consequence of the actual component in the network it represents, for example, due to receipt of state change events or performance measurement changes from the monitoring system; and consequential state data as a result of the effect of a state change on some related component within the model which has been propagated by whatever means to cause an effect on another component within the model.

The use of the term 'network component' is intended to include, but is not restricted to, components within a network (such as a telecommunication network or the like), for example, switches etc, as well as all the other components of a network including but not limited to logical and service components of the network.

The method may further comprise selectively altering the component configuration data of more than one network component.

Alternatively, or in addition, the method may further comprise selectively altering component interconnection data for more than one connection.

It will be appreciated that the selective alteration of more than one network component/network connection allows the modeling of more complex failure scenarios within the network. This may more realistically reflect the actual operational experiences within a network, particularly where some network components are co-located and the local environment becomes compromised or local connectivity is disrupted.

In one embodiment, the method further comprises the step of identifying the effect of selectively altering component configuration data on the network outputs. However, it will be appreciated that the method of the present invention is not restricted to monitoring just the delivery of the network outputs, but is also useful to monitor the status at other points within the network as well as identification of vulnerabilities within the network.

The component configuration data and/or component interconnection data may be selected for altering in dependence upon predetermined selection parameters.

In a further embodiment, the method further comprises the step of recording the effect of said propagation on other network components within the network model.

A further aspect of the present invention provides a system for analysing a network which has a plurality of interconnected network components, the system comprising:

a component data storage unit operable to store component configuration data for each network component in the network, and component interconnection data for each connection between network components in the network, such stored data forming a network model;

a processing unit operable to alter selectively component configuration data stored in the storage unit relating to a first network component, or to alter selectively component interconnection data for a first connection, thereby to alter selectively a modeled state of such a first network component or such a first component connection within the network model; the processing unit also being operable to propagating the effect of such altering of a modeled state throughout such a stored network model in dependence upon stored configuration data and interconnection data relating to the first network component and in dependence upon such stored data relating to other network components; and a monitoring unit operable to monitor an effect of said propagation on stored data relating to other network components within the network model.

According to an example, there is provide a method for analysing a network including a plurality of interconnected network components using a network model including component configuration data for each of the network components and component interconnection data for each connection between network components, the method comprising selecting a set of network components representing a class of components of the network, selectively altering component configuration data for a first network component in the selected set, or selectively altering component interconnection data for a first connection of a component in the selected set, thereby selectively altering a modeled state of the first network component or the first component connection within the network model to one of multiple states corresponding to failure, degradation or partial compromise of the component or connection, propagating the effect of such altering of a modeled state throughout the network model in dependence upon configuration data and interconnection data relating to the first network component and in dependence upon such data relating to other connected network components, monitoring the effect of said propagation on other network components within the network model.

According to an example, there is provide a method for analysing a network to determine a vulnerability, comprising selecting a network component or interconnection within the network, modifying a state of the selected component or interconnection and determining the states of multiple other components or interconnections in the network in response to the change of state of the selected component or interconnection.

BRIEF DESCRIPTION OF THE DRAWINGS

Certain embodiments of the invention will now be described, by way of example only, and with reference to the accompanying drawings, in which.

DETAILED DESCRIPTION OF THE INVENTION

Figure 1:
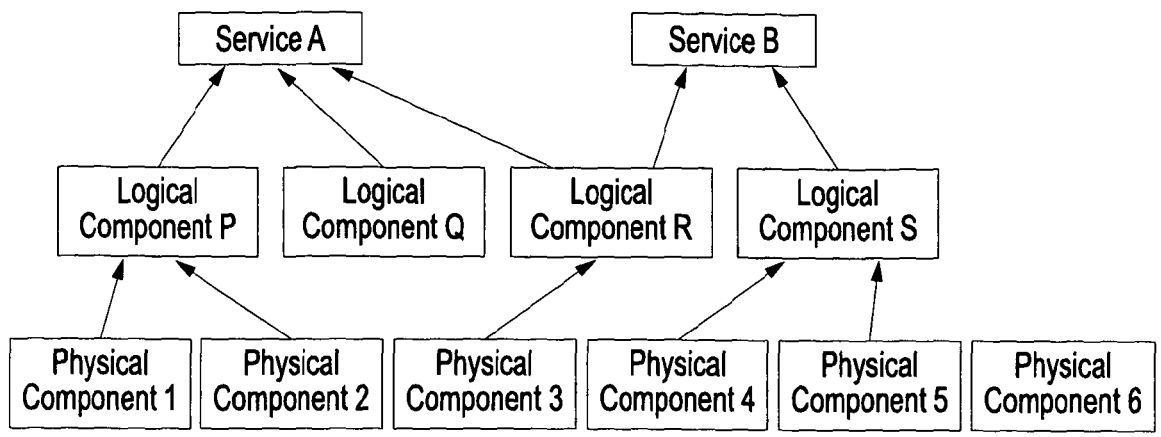
FIG. 1 illustrates an example of a network model.

FIG. 1 shows a network model of a sample network. It will be appreciated that a network model of any complexity may be used according to an example, and the network model of FIG. 1 is presented for illustrative purposes only.

Network model 10 comprises a plurality of components 20 representing physical, logical or service components such as routers, channels and IP TV services respectively for example. Each type of component 20 may be interconnected to any other type of component 30 in the same or another layer of the network model 10. It is to be appreciated that network model 10 illustrates a three tier hierarchy of interconnected components. However, more complex networks may be modelled and subject to the method of the present application.

Figure 2:
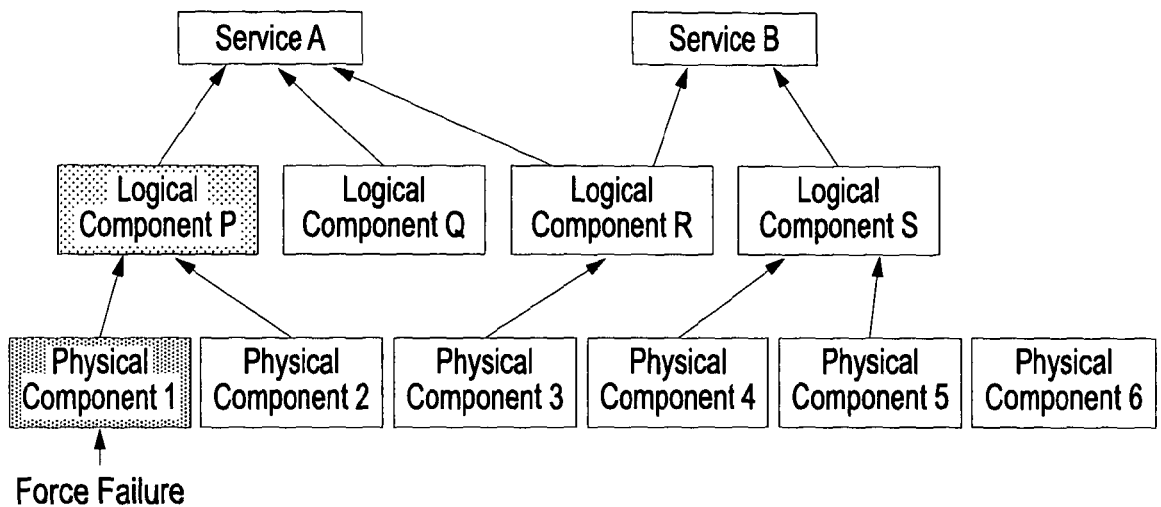
FIG. 2 illustrates the effect of carrying out a first embodiment of the method of the present invention on the network model of FIG. 1.

It may be desirable to modify the network model 10 shown in FIG. 1 to remove network components for maintenance. Alternatively, it may be desirable to modify the network in a more significant manner to modify the network arrangement. However, before doing this with the actual physical network, it is desirable to model such changes to assess the impact that such modifications will have. FIG. 2 shows the network model 10 of FIG. 1 with the configuration data of physical component 20A altered to reflect a degradation of physical component 20A. Degradation can include a reduction in the quality or volume of data passing via or from component 20A for example. The configuration properties of logical component 30A support redundancy i.e. the failure of both physical components 20A and 20B is required before logical component 30A itself fails. Therefore, although physical component 20A is compromised, logical component 30A remains unaffected and thus service components 40A, 40B remain unaffected and operational.

Figure 3:
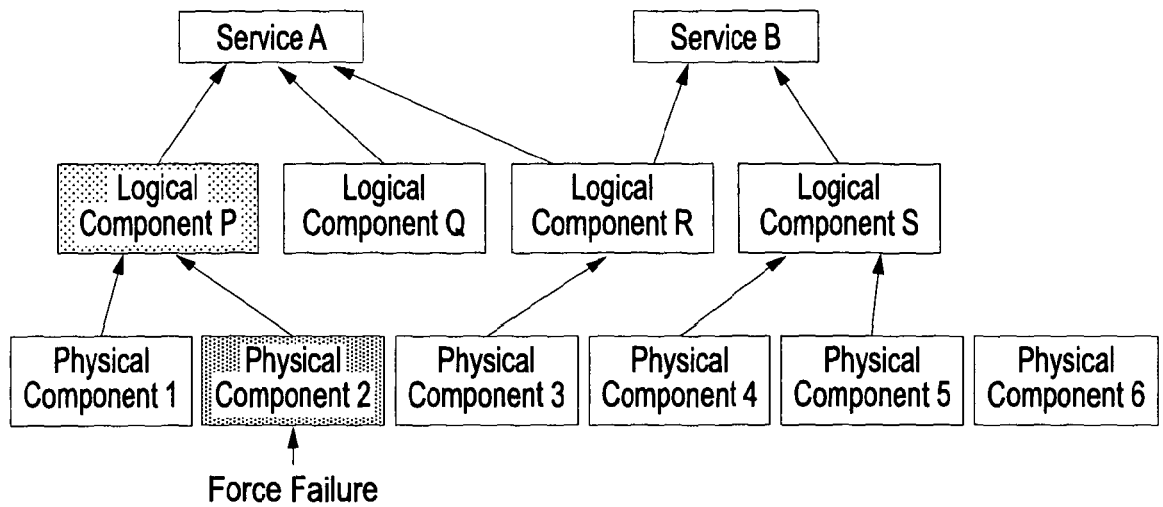
FIG. 3 illustrates the effect of carrying out a second embodiment of the method of the present invention on the network model of FIG. 1.

FIG. 3 demonstrates a further modification to network model 10. The configuration data of physical component 20B is modified to represent failure of the network component. Failure can include a total loss of data input to component 20B, such as data packets being dropped for example as a result of the component being unable to function. In this case, due to the aforementioned redundancy of logical component 30A, logical component 30A remains operationally unaffected and service 40A remains unaffected and operational.

Figure 4:
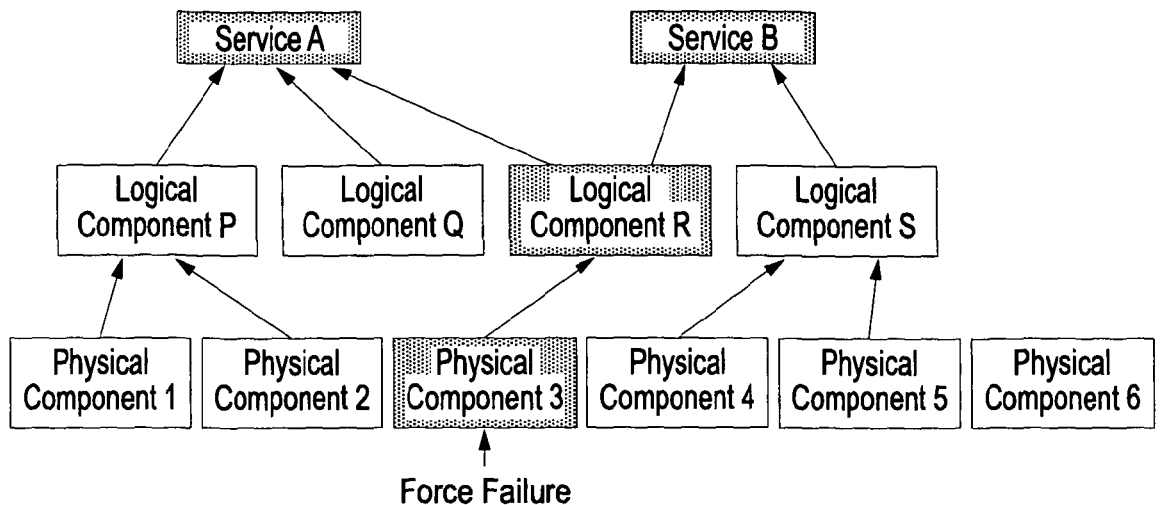
FIG. 4 illustrates the effect of carrying out a third embodiment of the method of the present invention on the network model of FIG. 1.

FIG. 4 shows an alternative modification where the configuration data of physical component 20C is modified to reflect the failure of physical component 20C. Physical component 20C is connected to logical component 30C. However, as logical component 30C has no redundancy, the simulated failure of physical component 20C results in the failure of logical component 30C. This is turn leads to the failure of service components 40A and 40B due to the interconnection of logical component 30C with service components 40A and 40B. Thus, unlike the situations in FIGS. 2 and 3, the failure of physical component 20C results in a failure of the network as a result of disruption to the operation of both service components 40A and 40B.

Accordingly, failure of components in the same level of a network cannot be assumed to have the same level of effect on the overall network and network outputs.

Figure 5:
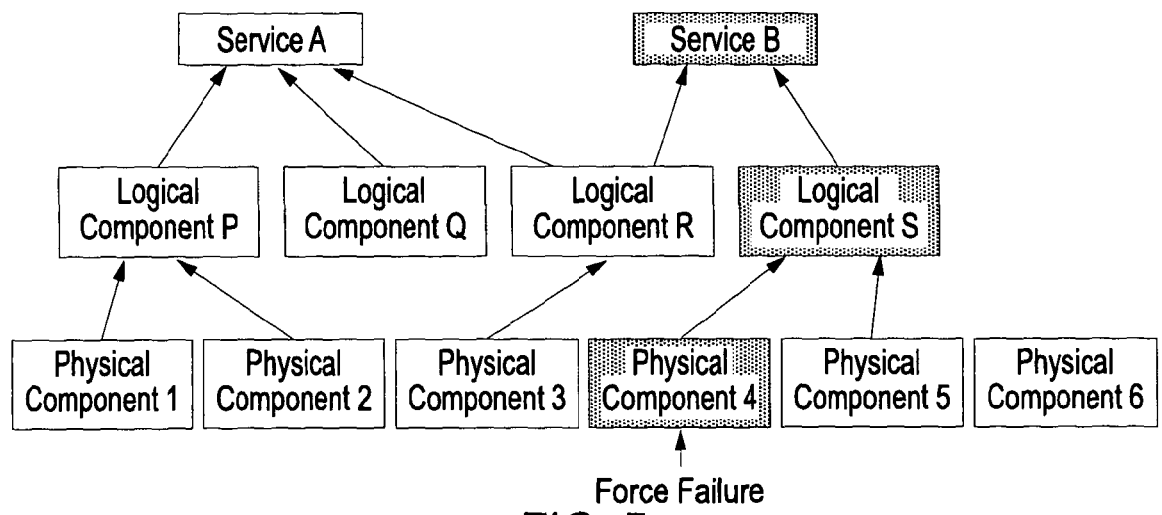
FIG. 5 illustrates the effect of carrying out a fourth embodiment of the method of the present invention on the network model of FIG. 1.

FIG. 5 illustrates the modification of the configuration data of physical component 20D to represent a failure of physical component 20D. This results in operational failure of logical component 30D and subsequent failure of connected service 40B. Thus, breaking physical component 20D can be seen to have a less serious effect than the example shown in FIG. 4 as only service component 40B is affected. However, it does highlight a weakness inherent in logical component 30C, i.e. that is non-redundant and therefore a failure of any of its supporting components such as physical component 20D or 20E will cause it to fail. In addition, this example demonstrates that service component 40A depends on logical component 30B, whose configuration data and state, including operational state, cannot be affected by a failure in the physical component layer 20.

Figure 6:
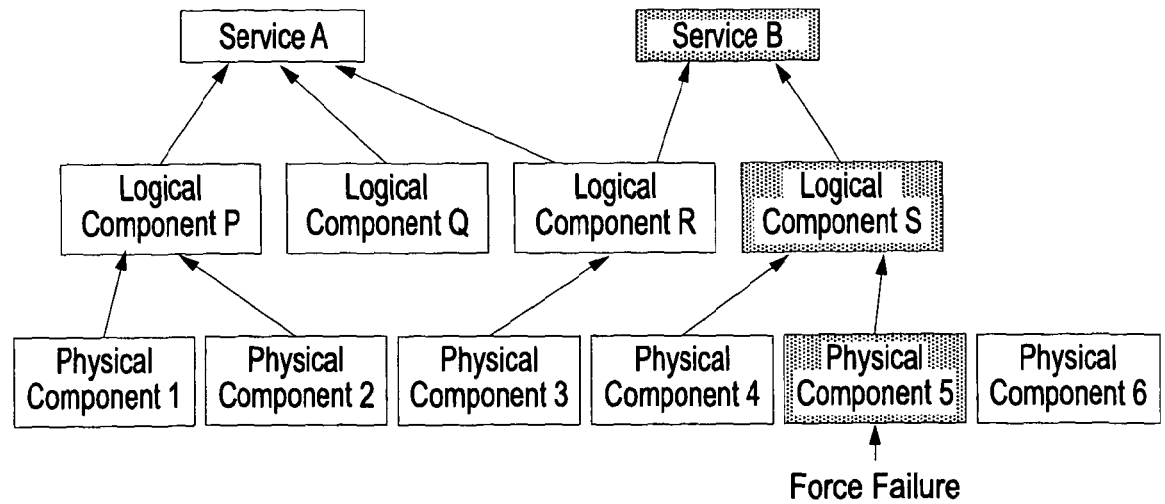
FIG. 6 illustrates the effect of carrying out a fifth embodiment of the method of the present invention on the network model of FIG. 1.

FIG. 6 illustrates the effects of configuration of the data of physical component 20E. This in turn affects the operation of logical component 30D and the subsequent operational failure of service component 40B.

Figure 7:
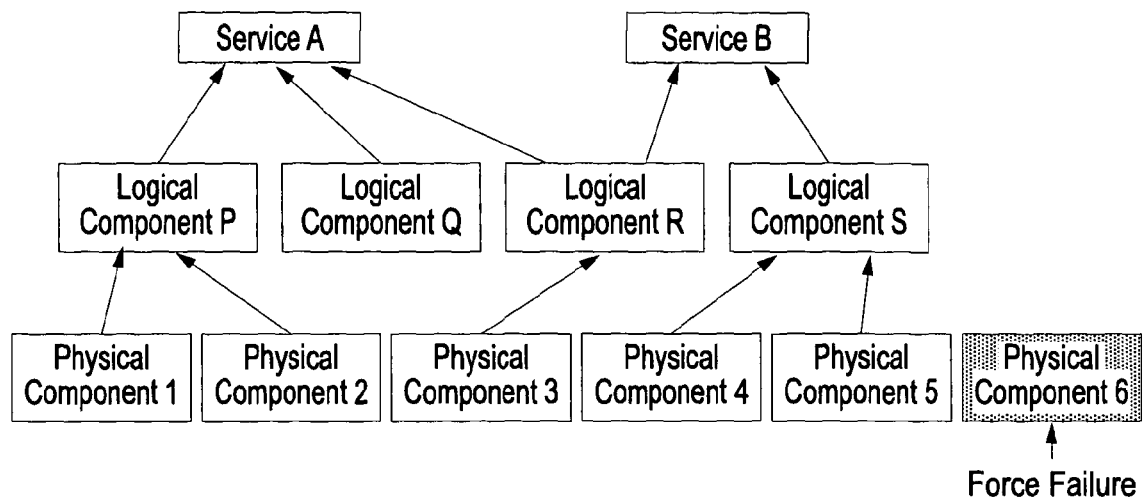
FIG. 7 illustrates the effect of carrying out a sixth embodiment of the method of the present invention on the network model of FIG. 1.

Finally, FIG. 7 illustrates the network model 10 of FIG. 1 with the selective alteration to the configuration data of physical component 20F. However, as can be seen from network model 10, physical component 20F is not connected to either of service components 40A or 40B and therefore the simulated failure of physical component 20F has no effect on the operation of service components 40A or 40B.

According to an example, the above-described modifications to network model 10 would typically constitute a first pass analysis of a network to identify the most exposed, vulnerable or influential regions of the network. It will be appreciated that, by its very nature, this type of 'bottom-up' analysis lends itself to detecting the effect on interconnected or dependent components within the network. In addition, the scalability of this approach allows the analysis of large numbers of network components without the burden of an onerous processing overhead.

A network analysis system according to an example can be efficiently applied to the simulation of multiple failures within a network. It will be appreciated that in order to analyse the effect of multiple failures on a system, there will be a combinatorial increase in the number of failed network components/component connections involved in a comprehensive testing of the network. For example, in a relatively simple network of 10,000 low level provider components, such as the physical components 20, the number of failure combinations to be tested to obtain a full analysis of the network would require a scan of (10,000×9999)/2 different simulated scenarios (even assuming that the order of failure is unimportant) to measure the final effect of a double failure on all possible sites within the network. The number of differently simulated scenarios continues to increase if additional network failures are included and this large number of network scans can be time consuming and difficult to monitor.

According to an example, a desired level of complex analysis is possible whilst obtaining the maximum benefit and information harvesting from the minimum number of failure combination network simulations. This is achieved by reducing the number of potential failure sites. The information to allow this would typically be obtained from the results of an initial network analysis such as previously described with reference to FIGS. 1 to 7, however, it may be possible to obtain this information from an alternative source such as historical data from a network indicating areas which have encountered issues in the past, or which are considered to be critical areas of the network (such as a set of network components serving one or more mission critical services for example). Once obtained, the initial network analysis information will allow the identification of the combinations that are most likely to have a significant effect on the network's vulnerability. A significant effect can include where one or more service components is adversely affected by a failure or partial degradation of one or more associated physical components for example. Alternatively, an effect can be significant it more than a predetermined number of components or services is adversely affected. A complex multiple failure scenario analysis can be carried out using those identified combinations only.

One or more of the following methods may be employed to reduce the number of network components to be scanned to those most likely to have a significant effect on the network's vulnerability. Some methods include:

1. Excluding low level components that do not contribute to service failures, or that do not contribute to failures in services considered to be mission critical for example. For example, in the network model of FIG. 1, physical component 20F would fall into this category.

2. Limiting potential failures to certain classes or sub-classes of components. For example, in the network model of FIG. 1, a reduction in the number of components to scan can be achieved by concentrating only on the physical component 20 layer and excluding the logical component 30 layer of the network from the analysis. Accordingly, a class or sub-class of components can be selected, and all or some components within that class can be scanned to determine the effect that any potential failures or partial compromises would have on the network. Determining the effect of failures can include determining the effect that state changes to components upstream or downstream of the component or interconnection in question have.

3. Performing a network scan at a higher layer in the network model, so that the number of input components in each problem dimension is reduced. Typically, at relatively higher layers in a network hierarchy there exist fewer components. They will be affected by problems associated with components in relatively lower layers unless there is a significant amount of redundancy. Accordingly, a hierarchical scanning process can be used in which components in higher network layers can be scanned to determine the effects caused as a result of issues with connected components from lower layers. This increases the tractability of a network analysis compared to a 'bottom-up' approach in which components in lower or the lowest network layer are scanned.

4. Identifying a subset of dependent components that are of interest, for example the service components 40A, 40B of FIG. 1, and from existing knowledge of the network model structure identifying the subset of provider components that could contribute to their failure. For example, in a network in which there exist multiple core components or services, such components or associated service components can be prioritised for scanning. Other non-prioritised components can be scanned afterwards, or left un-scanned as desired.

5. Utilising historical data to identify likely failure sites and concentrate on the network components and connections at or feeding into these failure sites in the network. For example, from log information of a network, the likely location within the network, or specific components within a network which have historically experienced issues can be prioritised for scanning.

6. Utilise sophisticated randomising/analytical techniques to obtain the maximum benefit from the minimum calculation effort. For example, genetic algorithms can be used according to an example. A genetic algorithm is a technique to find solutions to optimization problems and is based on the principles of evolutionary natural selection. Any potential solution to the problem (ie. a 'chromosome', which in this case represents a set of interconnected network components) is encoded normally in the form of a series of 0 and 1 bits. Initially a large population of random solutions is created and each solution is evaluated in terms of a 'fitness score' (in this case, the resulting impact on service components). Two solutions are then chosen, the chance of selection being proportional to their 'fitness', and genetic operators such as crossover and mutation are applied to the bit patterns in order to evolve the solution. This process of creating a new 'generation' of solutions is repeated a fixed number of times or until a fixed level of optimal solution is achieved.

As will be appreciated from the methods set out above, a network component selection method according to an example provides flexible input data set choices in dependence upon the network type, analysis criteria and network failure types being analysed. In combination with the ability for users to provide their own algorithms to perform multi-site failure analysis, this method for the analysis of the vulnerabilities of the network is extremely powerful. For example, an analysis of historical failures where particular combinations of failures have caused significant network outages can be used to provide an algorithm that allows previous 'bad-day' experiences to be quantified and replayed through any new model to see how it would have reacted. These can be generalised so that they do not just use the original failure locations, but can be applied at any relevant location in a new model structure.

Once the scan phase has been completed, there exist many possibilities for analysing and presenting the results e.g. tabular, model visualisation overlays, animations etc, with the aim of providing output data that is easily interpreted and therefore immediately useful for assessing the vulnerabilities of the network to single points of failure. For example, such a tabular presentation is shown below with reference to the network model of FIG. 1:

TABLE 1

| Failed Component | Number of services affected | Impact |
| --- | --- | --- |
| Physical component 20A | 0 | None |
| Physical component 20B | 0 | None |
| Physical component 20C | 2 | Severe |
| Physical component 20D | 1 | Medium |
| Physical component 20E | 1 | Medium |
| Physical component 20F | 0 | None |

Figure 8:
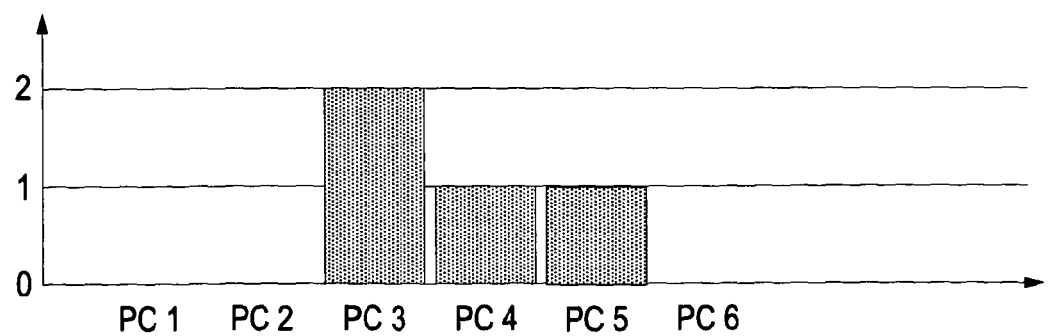
FIG. 8 is a bar chart presenting the vulnerabilities within the network model of FIG. 1.

Alternatively, the results may be provided in graphical form, as shown in FIG. 8. FIG. 8 shows a bar chart containing the same information as presented in the above Table 1.

Although aspects of the invention have been described with reference to the embodiments shown in the accompanying drawings, it is to be understood that the invention is not limited to the precise embodiments shown and that various changes and modifications may be effected without further inventive skill and effort.

The invention claimed is:

1. A method of analyzing a network which has a plurality of interconnected network components, the method comprising:

storing, in a data storage unit, data relating to a network model, such stored data including component configuration data for each of the network components and interconnection data for each connection between network components;

retrieving stored data relating to at least one of a first network component or to a first network interconnection;

selectively altering such retrieved component configuration data or interconnection data, and storing the altered data, thereby selectively altering a modeled state of the first network component or the first connection within the network model;

retrieving stored data relating to other network components and interconnections;

altering such retrieved data relating to other network components and interconnection so as to propagate an effect of alteration of such modeled state throughout the network model, the retrieved data being altered in dependence upon configuration and interconnection data relating to the first network component or first interconnection, and in dependence upon configuration and interconnection data relating to other connected network components;

storing such altered data, thereby monitoring the effect of said propagation on other network components within the network model;

storing data representing the effect retrieved of said propagation; and determining an effect of the altered first network component or first network interconnection by analyzing such stored data representing the effect retrieved of said propagation.

2. The method of claim 1, comprising retrieving and selectively altering the component configuration data of more than one network component.

3. The method of claim 1, comprising retrieving and selectively altering component interconnection data for more than one connection.

4. The method of claim 1, further comprising a step of identifying an effect of the altered first network component or first network interconnection on the network outputs by analysing such stored data representing the effect retrieved of said propagation.

5. The method of claim 1, wherein the component configuration data and/or component interconnection data is selected for altering in dependence upon predetermined selection parameters.

6. The method of claim 1, further comprising:
   selecting a set of network components representing a class of components of the network, wherein the first network component is in the selected set, or the first connection is connected with of a component in the selected set.

7. The method of claim 1, wherein selectively altering component configuration data for a first network component, or selectively altering component interconnection data for a first connection includes selectively altering a modeled state of the first network component or the first component interconnection within the network model to one of multiple states corresponding to a failure, degradation, compromise or partial compromise.

* * * * *